July 27, 1948.  M. MATSUDA  2,445,961
VEHICLE STOP AND TURN SIGNAL
Filed March 7, 1945  2 Sheets-Sheet 2
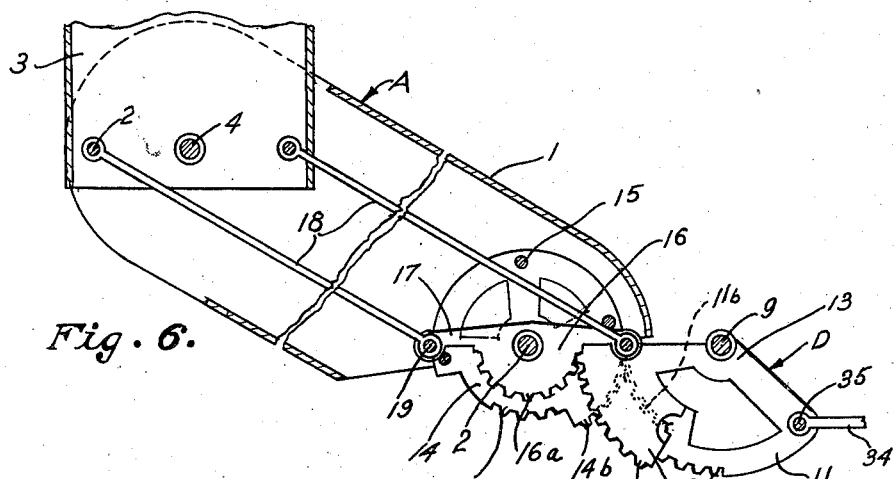
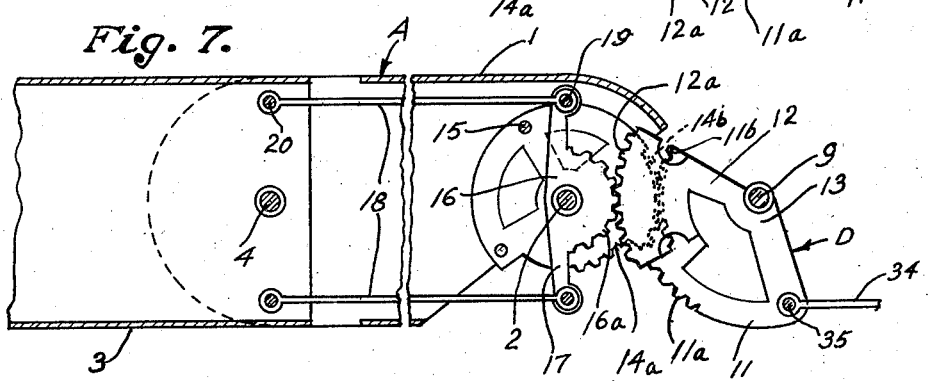
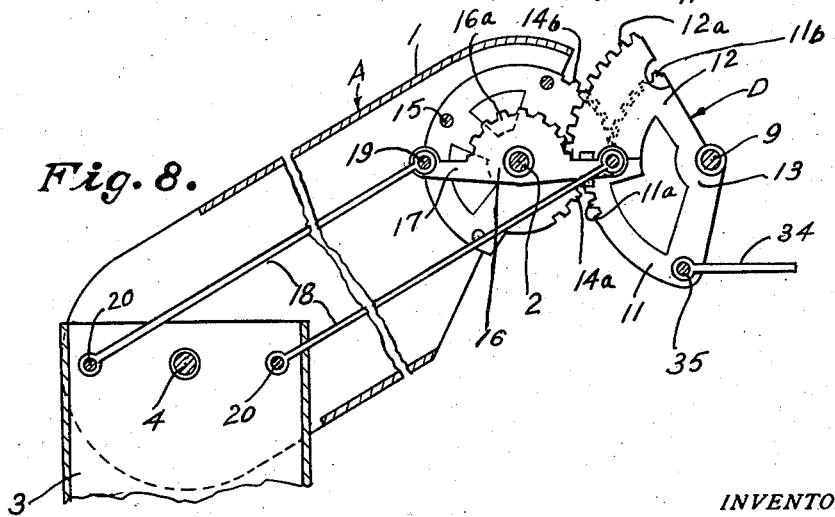
INVENTOR
MASAYOSHI MATSUDA
BY Edward M. Kojima
ATTORNEY Patented July 27, 1948

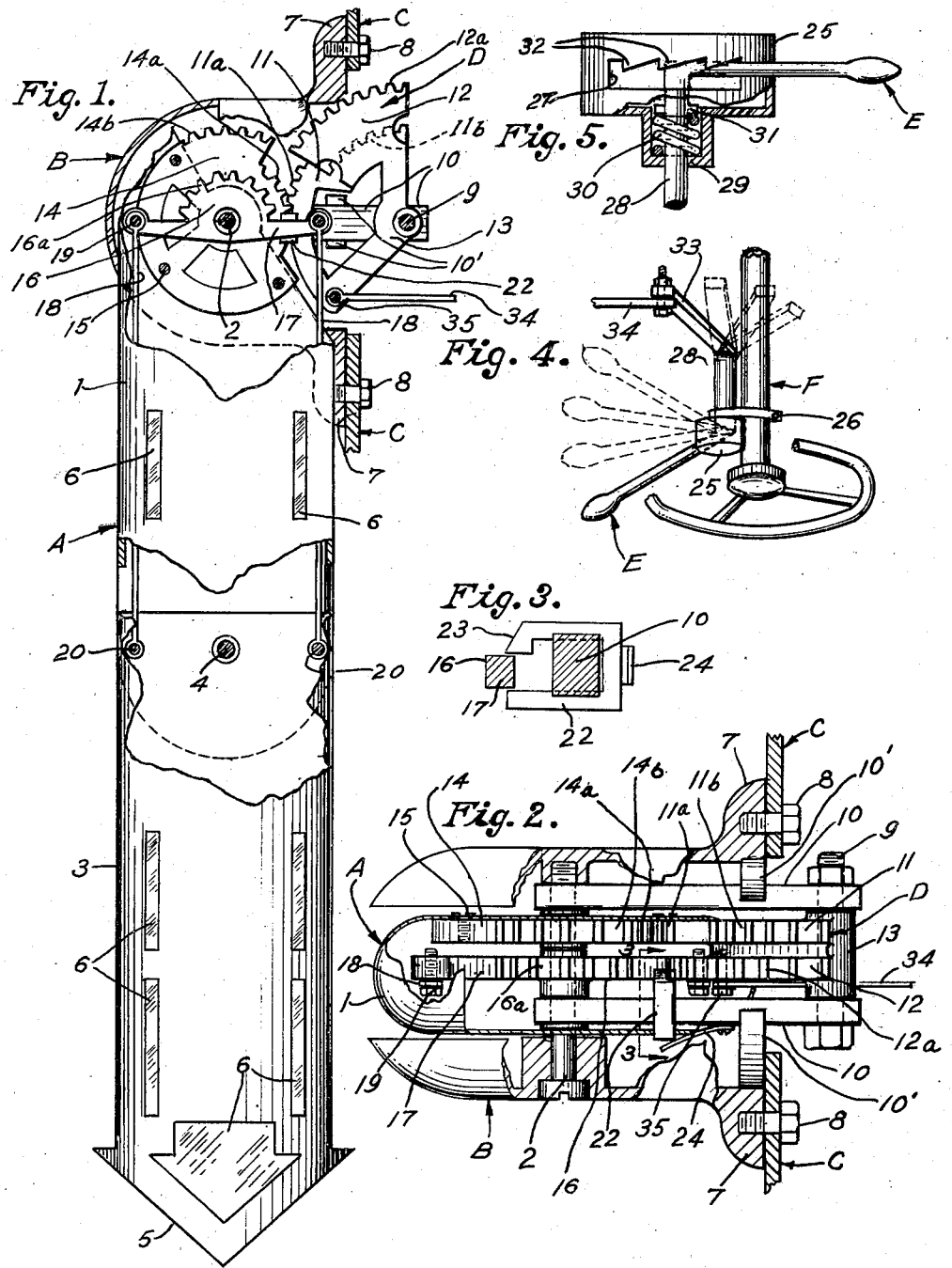

2,445,961

UNITED STATES PATENT OFFICE 2,445,961

VEHICLE STOP AND TURN SIGNAL

Masayoshi Matsuda, Cleveland, Ohio

Substituted for abandoned application Serial No. 422,127, December 8, 1941. This application March 7, 1945, Serial No. 581,353

13 Claims. (Cl. 116—52)

This invention has for its primary object to provide a new and efficient signal device by means of which the driver of a vehicle may effectively indicate to approaching and following vehicles and pedestrians the intended movements of the vehicle.

This application is a substitute for my earlier application, Serial No. 422,127, filed December 8, 1941, which was abandoned.

An object of the present invention is to provide in a direction signal of the character described a novel form of articulated semaphore which closely simulates the human arm for producing stop and right and left turn signals that command attention due to the similarity to the human arm and the manner in which the semaphore is operated and presented in various signalling positions.

Another object is to provide a signal device such as described wherein the operating means therefor is simple, small, compact, inexpensive, reliable in operation and particularly easy of manipulation and brings about an articulation of the semaphore in a most effective manner.

A further purpose is to provide a signal device of the character described which may be readily and easily attached to an automobile without changing the construction of the latter and readily manipulated by the driver through the medium of a single conveniently located lever.

With the foregoing objects in view, together with such other objects and advantages as may subsequently appear, the invention is carried into effect as illustrated by way of example in the accompanying drawing, in which:

Fig. 1 is a fragmentary elevational view of a signal device embodying my invention and shown in non-signalling position as when attached to an automobile;

Fig. 2 is a fragmentary top plan view of the device shown in Fig. 1;

Fig. 3 is a cross sectional view taken on line 3—3 of Fig. 2 showing the locking means;

Fig. 4 is a fragmentary perspective view of the operating lever shown attached to the steering column;

Fig. 5 is a fragmentary elevational view, partly in section, of the operating lever;

Figs. 6, 7 and 8 are fragmentary semi-schematic sectional views of the articulated semaphore and associated operating mechanism shown in right turn, left turn and stop positions respectively.

Referring to the drawing more specifically, A designates an articulated semaphore, B a housing bracket affording attachment of the semaphore to a vehicle part of which is indicated at C. D a geared operating mechanism for swinging and articulating the semaphore, and E represents a lever on the steering column F and connected with the geared mechanism D so that the semaphore may be moved into and out of right turn, left turn and stop positions as respectively shown in Figs. 6, 7 and 8.

As here shown the articulated semaphore A includes a tubular inner section 1 having its inner end mounted on a pivot pin 2 carried by the housing B. The outer end of the section 1 of the semaphore arm telescopes the inner end of an outer tubular section 3 and is pivoted thereto by means of a pin 4. The outer end of the section 3 of the semaphore arm may be shaped as an arrow head as at 5. Both sections of the arms may have transparent or translucent panes 6 of glass or the like to facilitate illumination of the arm from a source of light (not shown) but which may be located within the arm and operated in any suitable manner.

The housing-bracket B has ears 7 which may be secured by fastenings 8 to the desired part of an automobile, for example, the portions C thereof as shown in Figs. 1 and 2.

The geared operating means D is carried by the housing B and includes a pivot pin or shaft 9 secured to and extending between spaced parallel bars 10 fixed to the semaphore pivot pin 2 and extending between lugs 10' on the housing. Pivoted on the pin 9 is a multiple quadrant gear unit which comprises spaced parallel quadrants 11 and 12 fixed to a common hub 13 which is free to turn on the pin 9. Quadrant 11 is provided with toothed or gear portions 11—a and 11—b, the gear portion 11—b being inwardly offset from the portion 11—a. Quadrant 12 has a single gear portion 12—a.

The gear portion 11—a of quadrant 11 is set to mesh with a gear portion 14—a on a quadrant 14 secured to the semaphore section 1 by means of screws 15 as shown in Fig. 2. Quadrant 14 is free to turn on the pin 2 and has an outwardly offset gear portion 14—b adapted to mesh with the gear portion 11—b of the quadrant 11.

Gear portion 12—a of quadrant 12 is adapted to mesh with a gear portion 16—a of a rocker member 16 freely rotatable on the pin 2. This rocker member includes arms 17 extending from opposite sides of the center thereof. Rods 18 are pivoted at their inner ends as at 19 to the outer ends of the rocker arms 17 and are pivoted as at 20 to the section 3 of the semaphore A on opposite sides of the pivot 4, as shown in Fig. 1.

A U-shaped lock member 22 is slidably supported on one of the bars 10 as shown in Figs. 2 and 3, so as to be movable into and out of position embracing one of the arms 17. A beveled or cam surface 23 on the lock member 22 is engaged by the gear portion 12—a of quadrant 12 whereby to force the lock out of locking position against the action of a leaf spring 24 fixed to the bar 10 on which the lock is mounted. This spring urges the lock member into position to hold the rocking member 16 against rocking relative to pin 2.

The lever E is mounted on a bracket 25 secured by a strap 26 to the steering column F, as shown in Fig. 4. The lever extends through a slot 27 in the bracket and has its inner end fixed to a shaft 28 journalled as at 29 in the bracket. A spring 30 (see Fig. 5) operating between a pin 31 on the shaft 28 and the bracket urges the shaft outwardly so that the lever E will be urged to cooperate with ratchet teeth 32 along one margin of the slot 27 to provide for holding the lever in its different operative positions.

On the lower end of the shaft 28 (Fig. 4) is a crank arm 33 to which a connecting rod 34 is connected. This connecting rod is extended as desired to connect as at 35 (see Fig. 1) with the quadrant 11.

Operation

Assuming the semaphore A is in non-signalling position hanging straight down from the housing B as shown in Fig. 1, when it is desired to make a "stop" signal as shown in Fig. 1, the operator moves the lever E to the left of the full line position shown in Fig. 4 to the first dotted position next above in Fig. 4, or in other words one "notch." This pulls on the connecting rod 34 so that the quadrant 11 is turned and the gear portion 11—a thereon meshing with gear portion 14—a on the quadrant 14 causes the latter and the section 1 of the semaphore arm to swing on the pivot pin 2 into position shown in Fig. 8. As the lock member 22 holds the rocker 16 against turning during the aforesaid operation, the inner section 1 of the semaphore arm turns on the pivot 4 relative to the outer semaphore section 3 which latter is therefore held in vertical position but is moved bodily outward with the section 1. Thus the two semaphore sections assume the downward pointing angular position shown in Fig. 8 and make a stop signal as would be made with the human arm.

Further movement of the lever E to the left, say into the second notch, will cause the quadrant 12 to engage the cam face 23 on the lock 22 and withdraw the latter so as to free the rocker 16. Following this the gear portion 12—a will nest with gear portion 16—a on the rocker and turn the latter on the pin 2 so that the rods 18 will pull the sections 3 of the semaphore upwardly into alignment with the section 1 while the latter is being moved into horizontal position by means of the meshing gear portions 11—b and 14—b of the quadrants 11 and 14 respectively. This completes the left turn signal as shown in Fig. 7.

To make a right turn signal the lever is moved to the last "notch" and the gear portions 12—a and 16—a and 14—b and 11—b cause the two semaphore sections to assume the angular relation (upward pointing position) shown in Fig. 6.

The return of the lever to its non-signalling position from any one of its signalling positions will cause the semaphore to return to the vertical non-signalling position shown in Fig. 1. When the quadrant 12 moves clear of the lock member 22 the spring for actuating said member moves it back into the locking position holding member 16 against movement. The notches or teeth along one margin of the slot 27 serve to hold the lever E and the signal mechanism in the position into which they are moved.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a vehicle stop and turn signal, a bracket adapted for attachment to a vehicle, a sectional articulated semaphore arm pivoted on said bracket, gearing associated with said bracket and semaphore arm for swinging said arm into signalling positions, including a rocker member movable about its pivot to tilt one section of the arm relative to the other section, rods pivotally connecting said rocker member with said one section, means for operating said gearing to move the arm about its pivot on the bracket and to operate said rocker member for tilting said one section of the arm relative to the other arm section, and lock means normally holding said rocker member against rocking and responding to predetermined movement of said gearing to release said rocker member.

2. In a vehicle stop and turn signal, a bracket adapted for attachment to a vehicle, a sectional articulated semaphore arm pivoted on said bracket, gearing associated with said bracket and semaphore arm for swinging said arm into signalling positions, including a rocker member movable about its pivot to tilt one section of the arm relative to the other section, rods pivotally connecting said rocker member with said one section, means for operating said gearing to move the arm about its pivot on the bracket and to operate said rocker member for tilting said one section of the arm relative to the other arm section, said gearing including a pin on said bracket, a hub rotatable on said pin, gear segments fixed to said hub for rotation therewith, a gear segment fixed to said arm and adapted to be meshed with one of the gear segments on said hub, another gear segment on said rocker member and adapted to mesh with a gear segment on said hub, and locking means normally holding said rocker member against rocking and responding to predetermined movement of one of the gear segments on said hub for releasing said rocker member.

3. In a vehicle stop and turn signal, a bracket adapted to be fixed to a vehicle, a sectional articulated semaphore arm pivoted on said bracket, means for moving said arm on its pivot and for moving one section of the arm relative to the other, including a rocker member mounted to rock on the pivot of said arm, a gear segment on said rocker member, means of operative connection between said rocker member and one section of said arm for moving said one section relative to the remainder of the arm, gear segments fixed to the section of the arm which is pivoted to the bracket, matching gear segments rotatable on said bracket and adapted to mesh with said gear segments on said arm, another matching gear segment on said bracket for meshing with the gear segment on said rocker member, a common rotatable mounting for said bracket supported gear segments, means for turning said rotatable mounting and simultaneously imparting a turning movement to the bracket supported gear segments, a lock means normally holding said rocker against rocking and adapted to be engaged by one of said bracket carried gear segments and moved out of locking position upon a predetermined movement thereof.

4. In a vehicle stop and turn signal, a bracket adapted for attachment to a vehicle, a sectional articulated semaphore arm pivoted on said bracket, means associated with said bracket and semaphore arm for swinging said arm into signalling position, including a rocker member movable about its pivot to tilt one section of the arm relative to the other section, attenuated means pivotally connecting said rocker member with said one section, means for operating said first means to move the arm about its pivot on the bracket and to operate said rocker member for tilting said one section of the arm relative to the other arm section, and lock means normally holding said rocker member against rocking and responding to predetermined movement of said first means to release said rocker member.

5. In a vehicle stop and turn signal, a bracket adapted for attachment to a vehicle, a sectional articulated semaphore arm pivoted on said bracket, means associated with said bracket and semaphore arm for swinging said arm into signalling positions, including a rocker member movable about its pivot to tilt one section of the arm relative to the other section, rods pivotally connecting said rocker member with said one section, means for operating said first means to move the arm about its pivot on the bracket and to operate said rocker member for tilting said one section of the arm relative to the other arm section, and lock means normally holding said rocker member against rocking and responding to predetermined movement of said first means to release said rocker member.

6. In a vehicle stop and turn signal, a housing adapted for attachment to a vehicle, a sectional articulated semaphore arm pivotally mounted in said housing, means associated with said housing and semaphore arm for swinging said arm into signalling positions, including a rocker member movable about its pivot to tilt one section of the arm relative to the other section, attenuated means pivotally connecting said rocker member with said one section, means for operating said first means to move the arm about its axis and to operate said rocker member for tilting said one section of the arm relative to the other arm section, at least one arm section having at least one long window mounted parallel to its long side, and lock means normally holding said rocker member against rocking and responding to predetermined movement of said first means to release said rocker member.

7. In a vehicle stop and turn signal, a bracket adapted for attachment to a vehicle, a shaft mounted on the said bracket, a sectional articulated semaphore arm pivoted on said bracket, gearing associated with said bracket and semaphore arm for swinging said arm into signalling positions, including a rocker member having a gear portion movable about its pivot to tilt one section of the arm relative to the other section, said gearing comprising a plurality of spaced gear members having different pitch diameters but a common hub mounted on said shaft so as to be freely rotatable, a second gear member secured to the said semaphore arm, one of the said plurality of gear members being adapted to mesh with the said second gear member, and another adapted to mesh with the geared portion of the said rocker member, rods pivotally connecting said rocker member with said one section, means for operating said gearing to move the arm about its pivot on the bracket and to operate said rocker member for tilting said one section of the arm relative to the other arm section, and lock means normally holding said rocker member against rocking and responding to predetermined movement of said gearing to release said rocker member.

8. In a vehicle stop and turn signal, a bracket adapted for attachment to a vehicle, a shaft mounted on the said bracket, a sectional articulated semaphore arm pivoted on said bracket, gearing associated with said bracket and semaphore arm for swinging said arm into signalling positions including a rocker member having a gear portion movable about its pivot to tilt one section of the arm relative to the other section, said gearing comprising a hub mounted on said shaft so as to be freely rotatable, gear segments integral with said hub, a gear segment fixed to said arm and adapted to be meshed with one of the gear segments on said hub, said gear segment of said rocker member adapted to mesh with a gear segment on said hub, rods pivotally connecting said rocker member with one of the sections of the said arm, means for operating said gearing to move the arm about its pivot on the bracket and to operate said rocker member for tilting said one section of the arm relative to the other arm section, and locking means normally holding said rocker member against rocking and responding to predetermined movement of one of the gear segments on said hub for releasing said rocker member.

9. In a vehicle stop and turn signal, a bracket adapted to be fixed to a vehicle, a shaft mounted on the said bracket, a sectional articulated semaphore arm pivoted on said bracket, means for moving said arm on its pivot and for moving one section of the arm relative to the other including a rocker member mounted to rock on the said pivot of said arm, a gear segment on said rocker member, gear segments fixed to the section of the arm which is pivoted to the bracket, integral matching gear segments mounted on said shaft so as to be freely rotatable and adapted to mesh with said gear segments on said arm, another matching gear segment on said bracket for meshing with the gear segment on said rocker members, means of operative connection between said rocker member and one section of said arm for moving said one section relative to the remainder of the arm and means for turning said integral gear segments, a lock means normally holding said rocker against rocking and adapted to be engaged by one of the said integral matching gear segments and moved out of locking position upon a predetermined movement thereof.

10. In a vehicle stop and turn signal, a bracket adapted for attachment to a vehicle, a shaft mounted in the bracket, a sectional articulated semaphore arm pivoted on said bracket, a rocker member movable about the pivot of the said arm, common means associated with said shaft adapted to function with means on said semaphore arm for swinging said arm into a plurality of signaling positions and with means on said rocker member to tilt one section of the said arm relative to another section, attenuated means connecting said rocker member with said one section, means for operating said common means to move the arm about its pivot on the bracket and to operate said rocker member for tilting said one section of the arm relative to the other arm section, and lock means normally holding said rocker member against rocking and responding to predetermined movement of said common means to release said rocker members.

11. In a vehicle stop and turn signal, a bracket adapted for attachment to a vehicle, a shaft mounted on the said bracket, a sectional articulated semaphore arm pivoted on said bracket, each one of the sections having at least one long narrow window mounted parallel to its long side, gearing associated with said bracket and semaphore arm for swinging said arm into signalling positions including a rocker member having a gear portion movable about its pivot to tilt one section of the arm relative to the other section, said gearing comprising a hub mounted on said shaft so as to be freely rotatable, gear segments integral with said hub, a gear segment fixed to said arm and adapted to be meshed with one of the gear segments on said hub, said gear segment on said rocker member adapted to mesh with a gear segment on said hub, rods pivotally connecting said rocker member with one of the sections of the said arm, means for operating said gearing to move the arm about its pivot on the bracket and to operate said rocker member for tilting said one section of the arm relative to the other arm section, and locking means normally holding said rocker member against rocking and responding to predetermined movement of one of the gear segments on said hub for releasing said rocker member.

12. A vehicle stop and turn signal comprising a housing adapted for attachment to a vehicle, a pivot pin mounted in the said housing, a sectional articulated semaphore arm having first and second sections, said first section being pivotally supported at one end by the said pivot pin and having a pivot pin at its other end, said second section being pivotally pendently mounted at one end when in normal non-signalling position on the pivot pin at the end of the said first section, a rocker member pivotally mounted on the said first mentioned pivot pin, independent means associated with said housing for oscillating the said sections and rocker member including rigid attenuated means connecting said rocker member with said second section for oscillating said second section relative to said first section into signalling positions in response to movements of the rocker member and common means for operating the said independent means.

13. A vehicle stop and turn signal comprising a housing adapted for attachment to a vehicle, a pivot pin mounted in the said housing, a connector mounted on the said pivot pin, rotatable means mounted on the said pivot pin adjacent to and in axial alignment with the said connector, a first semaphore arm rigidly mounted at one end on the said rotatable means and having a pivot pin at the other end, a second semaphore arm pivotally pendently mounted at one end when in normal non-signalling position on the pivot pin on the said first arm, attenuated means operatively connecting the said connector and the said second arm at points radially spaced from the respective pivot pins, means associated with the said connector and rotatable means for oscillating the semaphore arms so that when the second arm is moved from its lower to its upper vertical signalling positions the ratio of the angular movement of the second arm to the angular movement of the first arm is constant and greater than one.

MASAYOSHI MATSUDA.

REFERENCES CITED

The following references are of record in the file of this patent:

UNITED STATES PATENTS

| Number | Name | Date |
|---|---|---|
| 1,648,579 | Cummings | Nov. 8, 1927 |
| 1,667,470 | Friedrich | Apr. 24, 1928 |
| 1,768,034 | Deblient | June 24, 1930 |
| 1,910,248 | Hernandez | May 23, 1933 |
| 1,970,332 | Miller | Aug. 14, 1934 |